(12) United States Patent
Jung

(10) Patent No.: US 8,033,169 B2
(45) Date of Patent: Oct. 11, 2011

(54) DEVICE AND METHOD FOR QUALITATIVE DETERMINATION OF THE CAVITATION ENERGY OF ULTRASOUND IN CONTAINERS

(75) Inventor: Rainer Jung, Berlin (DE)

(73) Assignee: BANDELIN Electronic GmbH & Co. KG, Berlin (DE)

( * ) Notice: Subject to any disclaimer, the term of this patent is extended or adjusted under 35 U.S.C. 154(b) by 550 days.

(21) Appl. No.: 12/187,515

(22) Filed: Aug. 7, 2008

(65) Prior Publication Data
US 2009/0049908 A1 Feb. 26, 2009

(30) Foreign Application Priority Data
Aug. 24, 2007 (EP) .................................. 07075730

(51) Int. Cl.
*G01F 23/28* (2006.01)
(52) U.S. Cl. ..................................... 73/290 V; 73/53.04
(58) Field of Classification Search ................ 73/290 V, 73/53.04, 290 R, 323, 590
See application file for complete search history.

(56) References Cited

U.S. PATENT DOCUMENTS

| | | | | |
|---|---|---|---|---|
| 3,443,797 | A | | 5/1969 | Branson |
| 4,854,337 | A | * | 8/1989 | Bunkenburg et al. .......... 134/184 |
| 4,979,994 | A | * | 12/1990 | Dussault et al. ................... 134/1 |
| 5,247,954 | A | * | 9/1993 | Grant et al. .................... 134/184 |
| 5,355,048 | A | * | 10/1994 | Estes .............................. 310/334 |
| 5,433,102 | A | | 7/1995 | Pedziwiatr |
| 7,287,425 | B2 | * | 10/2007 | Lagergren ................... 73/290 V |
| 7,395,827 | B2 | * | 7/2008 | Madanshetty ................ 134/184 |
| 7,443,079 | B2 | * | 10/2008 | Beck et al. .................... 310/328 |
| 2003/0087748 | A1 | | 5/2003 | Otsuki |

FOREIGN PATENT DOCUMENTS

| | | |
|---|---|---|
| DE | 4410032 | 10/1994 |
| GB | 2147104 A | 5/1985 |
| SU | 1196696 A | 12/1985 |

OTHER PUBLICATIONS

European Search Report for EP Patent Application 07075730.7-2213.
European Search Report for EP Patent Application 07075730.7-2213, Jan. 30, 2008.

* cited by examiner

*Primary Examiner* — J M Saint Surin
(74) *Attorney, Agent, or Firm* — Timothy X. Gibson, Esq.; Gibson & Dernier, LLP

(57) ABSTRACT

The present invention relates to a measuring chamber (6) for an ultrasonic bath (1) or for a container which is equipped with a low-frequency ultrasonic source (2) for cavitation generation, this measuring chamber being suitable for determining the cavitation energy via the increase in volume in a measuring liquid (10) contained in the measuring chamber, and the measuring chamber having in addition a container (7) with a sound-permeable window region (8) and a sensor (9) for measuring the increase in volume of the measuring liquid (10).

In addition, a method for operating this measuring chamber is presented.

With the measuring chamber according to the invention or the corresponding method (independent of a prescribed ultrasonic bath), reliable determination of the introduced ultrasonic power or a conclusion about the cleaning power is possible.

11 Claims, 1 Drawing Sheet

DEVICE AND METHOD FOR QUALITATIVE DETERMINATION OF THE CAVITATION ENERGY OF ULTRASOUND IN CONTAINERS

BACKGROUND

The invitation relates to a method and to a device for qualitative determination of the cavitation energy in a container, in the liquid volume of which cavitation is initiated by a suitable ultrasonic source. The smallest cavities microscopically are hereby formed constantly and visibly rise coagulating or also implode. As a result of this production of gas or vapour bubbles, cavitation leads to a measurable expansion of the liquid. In order to determine the cavitation energy, a hermetically sealed measuring chamber with a sound-permeable window region is disposed in the container. During operation of the ultrasonic source, the increase in volume of the measuring liquid, initiated by cavitation, can be determined in the measuring chamber with a short-term measurement. The relative increase in volume of the measuring liquid thereby corresponds in a good approximation to the cavitation energy introduced proportionally into the measuring chamber for the container. The cavitation energy crucially determines the ultrasonic effect and hence also for example the effective cleaning power of an ultrasonic bath. Via the relative increase in volume, for example the ultrasonic cleaning power produced by the container of an ultrasonic bath can be tested readily.

In ultrasonic cleaning and surface technology and also in medical fields and in industry, ultrasonic tubs or also other containers have been used for decades, which are equipped with the most varied of ultrasonic sources. In the case of typical ultrasonic baths these are ultrasonic converters fitted on the base or on the sides of the ultrasonic tub; however there is also a large number of other devices, such as e.g. immersible transducers, oscillating plates, tubular or bar-shaped ultrasonic converters, which are introduced into liquid containers in order there to initiate specifically the preferred ultrasonic cavitation. In the case of converters, preferably low-frequency ultrasonic systems are thereby used with operating frequencies between 18 kHz and 500 kHz since the cavitation initiated by them is greatest at low ultrasonic frequencies. The cleaning effect or the dirt-detaching effect of the cavitation on the surface of parts is then at its greatest. However, also different dispersing, de- and emulsifying and also sonochemical effects are greatest at a low operating frequency.

The central problem for many users of ultrasound is the requirement to be able to test their cleaning or cavitation power. Since direct measurability of the cavitation or cavitation energy which is introduced into the liquid by ultrasound is very difficult, alternative methods have been developed.

A current and very inexpensive possibility is represented by the so-called foil test according to IEC/TR 60886. A very thin aluminium foil is stretched hereby on a wire frame and retained diagonally in the ultrasonic bath for a defined, always constant time span. In the presence of cavitation, the foil is visibly attacked and planar perforations and/or holes are formed. When implemented at different points in time and under the same conditions, foil patterns of this type offer a basis for assessment of a constant or decreasing cleaning power in the ultrasonic bath. The reproducibility of the measuring conditions which is not always simple and also the fact that the foil itself changes the sound field in the ultrasonic bath are disadvantageous.

Further methods reside in detecting locally, by means of a small sound pressure sensor, the noise change pressure amplitude at a specific location in the ultrasonic bath and recalculating this value into an energy-equivalent value and displaying it.

The sound pressure sensor can thereby contain a single piezo element in bar form or has a sound pressure-sensitive membrane surface with a plurality of sensors. "Ultrasonic energy meter" or "cavitation meter" of this type are marketed for example by the company ppb/USA and are described also for example in the patent specifications U.S. Pat. No. 313,565 and U.S. Pat. No. 6,691,578.

A typical sensor arrangement with a plurality of piezo sensors on a quartz disc is described in U.S. Pat. No. 6,450,184. The described measuring apparatus for an ultrasonic bath is intended to serve for picking up the "cavitation profile" close to the surface of parts to be cleaned, for example wafer discs. The local distribution of the "cavitation energy" is intended to be determined from the summated electrical signals.

Common disadvantages of these technologies are the dependence of the measuring values upon the respective measuring location and also the sound field change caused by the measuring device itself. In the case of measurements by hand with single sensors, there is also an individual error component due to changes in position. In addition, the measured sound pressure offers no information about the cavitation since the context is non-linear to a high degree.

In order to test the cleaning function of ultrasonic baths also small test tubes are used. The test tubes are thereby placed in the ultrasonic bath at various positions in a cleaning basket. In the presence of cavitation, the test tubes show a colour change from green to yellow after a specific time. This is intended to be based on a cavitation-dependent pH value change in the solution in the tube which also still contains the smallest glass balls as cavitation-initiating nuclei. It should be borne in mind that the colour change is dependent upon the local ultrasonic intensity, upon the bath temperature and upon the ultrasonic frequency. If no colour change occurs, this does not automatically mean that no cavitation is taking place at the occupied position. Allegedly, it acts more at the outer surface of the tube but does not suffice to initiate the colour change. For spontaneous quick testing as to whether an ultrasonic device is still cleaning at all, test tubes can possibly be used. For qualitative assessment of the cleaning power of an ultrasonic bath, they are not suitable.

For more precise tests for the cleaning power of ultrasonic baths, occasionally measuring devices with broadband hydrophones are also used. In DE 102006026525, such a method is described for example. The cavitation-caused noise signals are thereby picked up by the hydrophone at various points in the ultrasonic bath, averaged and evaluated spectrally. The method and the required measuring and evaluation technology is very complex and not suitable for a routine testing of ultrasonic baths.

GB 2 147 104 A shows a measuring chamber for determining the energy generated from an ultrasonic source via the increase in volume of a measuring liquid contained in the measuring chamber, the measuring chamber having a container for receiving the measuring liquid with a sound-permeable window region and a sensor for measuring the increase in volume of the measuring liquid. In the preferred embodiments, an increase in volume of the bubble-free liquid which is then measured is achieved by heating. As an alternative, a cavitation measurement is mentioned.

SU 1 196 696 A1 discloses a measurement via a capillary tube.

Additional prior art is shown in DE 44 10 032 A1, U.S. Pat. No. 3,443,797 A and also US 2003/087748 A1.

SUMMARY OF THE INVENTION

The object therefore underlying the present invention is to provide a measuring chamber or a method for operation thereof, assessment of the ultrasonic cleaning power being possible via the measurement of a cavitation-caused increase in volume in a simple, reliable and wear-free manner.

This object is achieved by the subjects of the independent patent claims.

The occurrence of ultrasonic cavitation as an essential cause of the effect in the bath volume is dependent upon many and constantly changing influential factors. There are involved preeminently: objects present in the bath (basket, cleaning parts, test tubes), contamination, temperature, level, viscosity etc. In addition, the ultrasonic field is itself not homogeneous and changes constantly temporally, and hence size, intensity, distribution and the occurrence of cavitation bubbles can be very different.

In order to test the cleaning power of an ultrasonic bath, determination of the occurring or introduced cavitation energy in a sufficiently large partial volume of ultrasonic bath is adequate. The measuring method and the device should thereby be chosen such that the above-mentioned influences only have a small effect.

It is known that if cavitation is initiated in a liquid volume by a suitable ultrasonic source, the thereby resulting gas-or vapour bubbles lead to expansion of the liquid. This can be readily measured when choosing a sufficiently large liquid volume taking into account different boundary conditions.

In order to determine the cavitation energy of an ultrasonic bath, a sufficiently large and hermetically sealed measuring chamber with a sound-permeable window region is thereby proposed, which can be immersed in an ultrasonic bath. The ultrasonic bath is thereby filled with normal water which, despite regional differences in quality, behaves equally with respect to the physics of sound. During operation of the ultrasonic appliance—for example with an ultrasonic source on the ground—the increase in volume of the measuring liquid in the measuring chamber which is initiated by cavitation is then determined by means of a short-term measurement. The relative increase in volume of the measuring liquid can be determined directly or even indirectly by a suitable sensor on the measuring chamber. The increase in volume thereby corresponds in a close approximation to the cavitation energy introduced proportionately into the measuring chamber. The cleaning power of an ultrasonic bath can be tested well in this way from the ratio to the entire liquid volume.

Therefore a measuring chamber is involved for a bath or for a container which is equipped with a low-frequency ultrasonic source for producing cavitation. It is therefore hereby always important that it is a container with a liquid medium in which ultrasound is coupled. Preferably involved hereby there should be a "low-frequency" ultrasound, i.e. in the range between 20 kHz and 100 kHz but other frequencies up to 1 MHz are also possible. What is hereby fundamentally new is that the cavitation energy which is introduced by ultrasound (which also permits a conclusion about the cleaning power) is determined via the increase in volume of a measuring liquid contained in the measuring chamber. The measuring chamber hereby has a container with a sound-permeable window region (i.e. one or more windows or a single, continuous window which forms the surface). In addition, the container has a sensor for measuring the increase in volume of the measuring liquid. The measuring chamber is positioned in the container.

It is therefore advantageous that, with a "self-sufficient" system which can be introduced into any ultrasonic baths or containers, it is possible to draw conclusions about the ultrasonic power or cleaning power. An attachment to the electronics of the ultrasonic bath or to the ultrasonic generators there need not take place here but this is possible in order then to produce for example automatic switching off. However with an attachment care should be taken that corresponding disruptive influences are filtered out. The measuring chamber can be operated preferably also by battery operation if the electrical or electronic sensor device is configured to be very power-saving; in the case of a simple measurement with a capillary tube, this is itself unnecessary.

The method according to the invention for operating the measuring chamber contains the steps:

a) complete filling of the measuring chamber with a defined volume of measuring liquid with possibly sealing of the measuring chamber (according to the type of sensor, such a seal is necessary or not for physical reasons);

b) positioning of the measuring chamber in the ultrasonic bath or the container which is equipped with a low-frequency ultrasonic source, for example by securing over the tub edge;

c) filling of the container or ultrasonic bath, which is ready for operation, with the same liquid or a reference liquid up to the normal level marking (expediently the same liquid is used in the measuring chamber and also in the remaining container; in the case of a known relationship of the liquid in the measuring chamber and also a reference liquid which deviates herefrom in the ultrasonic bath, also different liquids can be used; it is merely important that, because of a known relationship, the values of the measuring chamber can be recalculated to the values in the ultrasonic bath/container);

d) setting of the ultrasonic source in operation or brief switching on of the ultrasonic bath, preferably in the seconds range (preferably 1 to 30 seconds, particularly preferred 1 to 10 seconds, very particularly preferred 1 to 5 seconds);

e) detection of the resulting increase in volume of the measuring liquid via the sensor and recording of the assessed value derived therefrom for the cavitation energy, the ultrasonic effect or also cleaning power of the ultrasonic bath or container.

Advantageous developments of the present invention are described in the dependent claims.

An advantageous development provides that the container of the measuring chamber with the sound-permeable window region has a defined, unchanging volume content and can be filled completely with the measuring liquid. The measuring liquid is hereby exchangeable and can be chosen to be different (according to the environmental conditions), in addition the device can be emptied for transport purposes.

A further advantageous development provides that the container with the sound-permeable window region has a rigid, hermetically sealed, non-flexible wall region. As a result, a defined separation of the liquid in the ultrasonic bath/container and also in the measuring chamber is achieved, no volume effects because of the compression of the container of the measuring chamber result here either. However, as an alternative (with different preconditions), the sound-permeable window region can have a flexible wall construction.

It is also important that the container has a sensor for measuring the increase in volume of the measuring liquid. This is possible in a particularly advantageous embodiment in that the sensor is configured as a capillary tube which is connected securely to the container so that, in the case of an increase in volume, the measuring liquid can rise in the capillary tube.

As an alternative, this sensor is possible also as a pressure-, bending or expanding sensor which is disposed preferably securely on the wall of the container of the measuring chamber and the increase in volume of the measuring liquid hence being able to be measured. In the case of these (preferably battery-operated) arrangements, also reference values can hereby be input for corresponding liquids or tables of values can be stored, which refer to the ultrasonic power/cleaning power in the ultrasonic bath/container.

The sound-permeable window region has, for a maximum sound permeability and perpendicular sound incidence, a specific thickness which corresponds to a multiple of half the wavelength of the material with respect to frequency. In practice, this purely theoretical case does not occur. Significant differences between the sound characteristic impedances of the measuring liquid to the reference liquid impair the sound permeability and must therefore be taken into account.

The sound-permeable window region can be manufactured from a metal, plastic material, glass or composite material. Taking into account a certain degree of absorption, the sound-permeable window region can also have a small wall thickness. There should be provided with "small wall thickness" hereby foils or thin discs with a thickness of 0.05 mm to 5 mm, preferably below 1 mm.

DETAILED DESCRIPTION OF THE INVENTION

The invention is explained now with reference to FIGS. 1 to 4.

Figure 1:
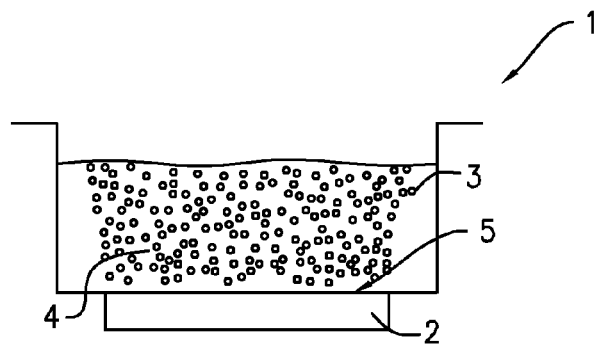
FIG. 1 shows in a diagram in section a normal ultrasonic bath 1, having a low-frequency ultrasonic source 2, filled with the liquid volume 3 and a cavitation field 4 which has been illustrated by small circles for the sake of simplicity.

FIG. 1 shows in a diagram in section a normal ultrasonic bath 1, having a low-frequency ultrasonic source 2, filled with the liquid volume 3 and a cavitation field 4 which has been illustrated by small circles for the sake of simplicity. The ultrasonic bath 1 here is for example an open tub, manufactured for example from stainless steel or plastic material. The ultrasonic source 2—for example a piezoelectric system—is fitted securely here on the base 5 of the ultrasonic bath 1 and is operated by a generator, not shown, with a sufficient HF energy in resonance. During active operation, the low-frequency ultrasonic source 2 generates longitudinal ultrasonic waves which propagate everywhere over the base 5 in the liquid volume 3 and generate an intensive cavitation field 4. The configuration, distribution and intensity of the cavitation occurrences in the cavitation field 4 are thereby irregular and not able to be determined exactly in advance. If the ultrasonic source 2 comprises a plurality of piezoelectric systems, distributed over the base 5 of the ultrasonic bath 1, the operation can begin with an approximately uniform intensity of the cavitation field 4 in the liquid volume 3.

Figure 2:
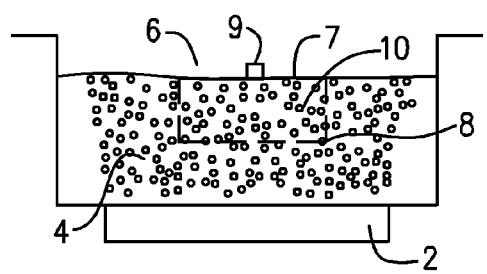
FIG. 2 corresponds essentially to the sectional representation in FIG. 1, a hermetically sealed measuring chamber 6 being immersed in the liquid volume 3.

FIG. 2 corresponds essentially to the sectional representation in FIG. 1, a hermetically sealed measuring chamber 6 being immersed in the liquid volume 3. The measuring chamber 6—indicated by a larger line thickness—comprises a container 7 with a sound-permeable window region 8 (broken line) and a sensor element 9. The measuring chamber 6 is filled completely with a measuring liquid 10 of a defined volume in which cavitation can be initiated by ultrasonic excitation—for example with water. The container 7 and the sound-permeable window region 8 comprise a rigid, non-expandable material with a small wall thickness. The sensor element 9 can be integrated in the container wall or fitted from outside.

During operation of the ultrasonic source 2, an intensive ultrasonic field 4 is produced in the liquid volume 3 of the ultrasonic bath 1. This takes effect via the sound-permeable and large-scale window region 8 of the container 7 into the measuring chamber 6. As a result, cavitation is also produced in the measuring liquid 10 and the volume increases. The increase in volume of the measuring liquid 10 is measured via the sensor element 9. The operating or measuring time should however be short—for example be in the seconds range—in order to be able to neglect measuring errors due to a temperature-caused increase in volume of the measuring liquid 10. Also the temperature dependency of the expansion coefficient of liquids must thereby be taken into account in general.

The measurable increase in volume is generally small and extends in the μl to ml range. It is crucially dependent upon the size of the window region 8 and also upon the measuring volume 10. These should therefore be chosen to be as large as technically possible.

FIG. 3 again shows in a diagram in section an embodiment of the measuring chamber 6 according to the invention having a large rectangular container 7 which has three diagonal window regions 8a, 8b and 8c.

Figure 3:
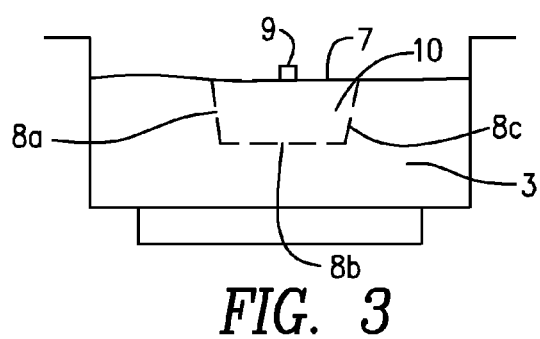
FIG. 3 shows in a diagram in section an embodiment of the measuring chamber 6 according to the invention having a large rectangular container 7 which has three diagonal window regions 8a, 8b and 8c.
Figure 4:
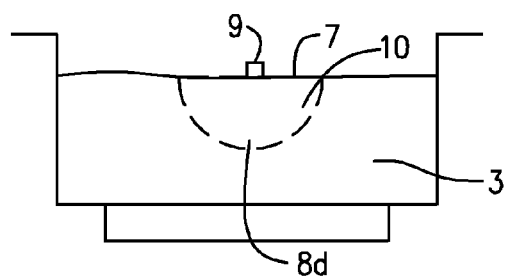
FIG. 4 shows a similar embodiment to FIG. 3, the container 7 having a round or oval window region 8d.

FIG. 4 shows a similar embodiment to FIG. 3, the container 7 having a round or oval window region 8d.

FIGS. 3 and 4 together are an attempt to configure the container 7 and also its window region 8 to be as large as possible, in order that the increase in volume initiated by cavitation in the measuring liquid 10 is large. Container and window region can also be assembled in a segment-like manner from a plurality of similar or different volume segments and have different contours in section. Merely a large-scale design/configuration of the sound-permeable region is important.

The increase in volume can be detected directly or indirectly via a sensor element 9 on the container 7 of the measuring chamber 6. Indirect measurement of the increase in volume is possible for example via a strain gauge integrated in the wall of the container 7. For direct measurement of the increase in volume of the measuring liquid 10, evaluation of the liquid level in a calibrated capillary as sensor is possible. This is fitted on the container for this purpose or is directly connected to it.

However other types of measuring value detection of the increase in volume are possible—for example via a differential pressure measurement.

The measuring value of the increase in volume is converted via an evaluation and/or converter device, not shown, into a display- and processing-capable parameter value. The evaluation unit has normal optoelectronic, mechanical and/or electronic components.

It has been shown that the increase in volume of the measuring liquid 10 which is caused by the cavitation occurring in the measuring chamber 6 or by the cavitation energy introduced there can be determined readily and can be used as a measure of the cleaning power of an ultrasonic bath.

By means of the integrated measurement of innumerable cavitation occurrences in a relatively large partial measuring volume or measuring volume of the ultrasonic bath—the measuring chamber 6—non-homogeneities of the ultrasonic field, unequal sound field distributions and intensity differences only play a small part in the qualitative determination of the cavitation energy of an ultrasonic bath.

The method for qualitative determination of the cavitation energy of ultrasound in containers, for example in ultrasonic baths, is intended to be described subsequently in more detail, in particular the method for operating the device according to the invention by means of a typical ultrasonic bath.

In the first step, the measuring chamber 6 is filled completely with a defined volume of measuring liquid 10 and possibly sealed, according to the choice of sensor type. The measuring liquid can be normal municipal water or an aqueous solution with expansion supplements. Measuring and bath liquid should be identical with respect to their physical properties (viscosity, temperature, composition etc.).

In a second step, the measuring chamber 6 is positioned in the ultrasonic bath 1, for example by securing over the tub edge.

In a third step the ultrasonic bath 1, ready for operation, with the same liquid—for example municipal water of the same temperature—is filled up to the normal level marking (=operating level quantity according to the manufacturer's directions). Care should be taken about temperature equalisation temporally according to the bath size.

In a fourth step, the ultrasonic source 2 is set in operation or the ultrasonic bath 1 is switched on as normal. The operating time should be chosen to be short, for example in the seconds range of 1 sec to 5 sec in order to be able to neglect larger measuring errors due to a temperature-caused increase in volume of the measuring liquid 10. The increase in volume arising at this time is detected via the sensor 9 and evaluated and displayed as a measure of the cleaning power of an ultrasonic bath. The technical parameters of the ultrasonic bathing—for example the power—can also usefully be jointly processed in the evaluation and display unit. Hence, it would also be possible to draw conclusions about the maintenance or impairment in the overall degree of efficiency.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A measuring chamber for an ultrasonic bath or for a container which is equipped with a low-frequency ultrasonic source for cavitation generation, for determining the cavitation energy via the increase in volume of a measuring liquid contained in the measuring chamber, the measuring chamber having a container for receiving the measuring liquid with a sound-permeable window region and a sensor for measuring the increase in volume of the measuring liquid wherein the measuring chamber is positioned in the container equipped with the low-frequency ultrasonic source.

2. A measuring chamber according to claim 1, wherein the container with the sound-permeable window region has a defined, unchanging volume content and can be filled completely with a measuring liquid.

3. A measuring chamber according to claim 1, wherein the container with the sound-permeable window region has a rigid, hermetically sealed, non-flexible wall construction.

4. A measuring chamber according to claim 1, wherein the container with the sound-permeable window region has a flexible wall construction.

5. A measuring chamber according to claim 1, wherein the sensor is fitted on the container comprising the measuring liquid for measuring the increase in volume of the measuring liquid.

6. A measuring chamber according to claim 1, wherein the sensor is configured as a capillary tube which is connected securely to the container comprising the measuring liquid so that the measuring liquid can rise in the capillary tube during an increase in volume.

7. A measuring chamber according to claim 1, wherein the sensor is mounted securely in or on the wall of the container comprising the measuring liquid and, as a pressure, bending or expansion sensor, can measure the increase in volume of the measuring liquid.

8. A measuring chamber according to claim 1, wherein the container comprising the measuring liquid and the sound-permeable window region comprises a metal, plastic material, glass or composite material with a small wall thickness.

9. A method for operating the measuring chamber according to claim 1, comprising the steps: a) filling the measuring chamber completely with a defined volume of measuring liquid and optionally sealing the measuring chamber according to the choice of sensor type; b) positioning the measuring chamber in a container which is equipped with a low-frequency ultrasonic source, or in an ultrasonic bath; c) filling the container or ultrasonic bath, which is ready for operation, with the same liquid or a reference liquid up to a normal level marking; d) setting the ultrasonic source in operation or switching on the ultrasonic bath over a short operating time; e) detecting the resulting increase in volume of the measuring liquid via the sensor and recording the assessed value derived therefrom for the cavitation energy, the ultrasonic effect and/or cleaning power of the ultrasonic bath or container.

10. The method according to claim 1 wherein the positioning step comprises securing the measuring chamber over the edge of an ultrasonic bath.

11. The method according to claim 10 wherein the short operating time is less than one minute.

* * * * *